(12) United States Patent
Weber et al.

(10) Patent No.: US 6,419,354 B1
(45) Date of Patent: Jul. 16, 2002

(54) INK JET PRINTER METHOD

(75) Inventors: Helmut Weber; Leslie Shuttleworth, both of Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/643,789

(22) Filed: Aug. 22, 2000

(51) Int. Cl.$^7$ .................................................. B41J 2/01
(52) U.S. Cl. ......................... 347/101; 347/100; 347/96
(58) Field of Search .......................... 347/100, 96, 105, 347/101; 428/195

(56) References Cited

U.S. PATENT DOCUMENTS

| | | | | |
|---|---|---|---|---|
| 4,255,326 A | * | 3/1981 | Giles et al. .................. | 534/768 |
| 5,073,634 A | | 12/1991 | Dix et al. | |
| 5,354,601 A | * | 10/1994 | Kamijo et al. ............... | 428/216 |
| 5,560,996 A | * | 10/1996 | Ito et al. ...................... | 347/105 |
| 5,935,903 A | * | 8/1999 | Goss et al. ................... | 428/195 |

FOREIGN PATENT DOCUMENTS

| EP | 0 633 143 A1 | 11/1995 | | |
|---|---|---|---|---|
| EP | 0813978 A1 | * | 12/1997 | ............ B41M/5/00 |

* cited by examiner

*Primary Examiner*—John Barlow
*Assistant Examiner*—Manish S Shah
(74) *Attorney, Agent, or Firm*—Harold E. Cole

(57) ABSTRACT

An ink jet printing method, including the steps of:

A) providing an ink jet printer that is responsive to digital data signals;

B) loading the printer with ink-receptive elements, including a support having thereon a porous ink-receptive layer;

C) loading the printer with an ink jet ink composition including: water, a humectant, and a delocalized cationic azo dye derived from the quaternization of a nitrogen heterocyclic azo dye having the following formula:

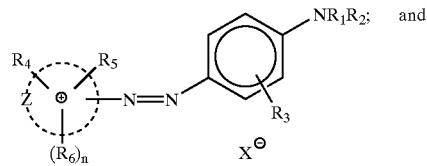

D) printing on an ink-receptive substrate using the ink jet ink in response to the digital data signals.

10 Claims, No Drawings

INK JET PRINTER METHOD

CROSS REFERENCE TO RELATED APPLICATIONS

Reference is made to commonly assigned, co-pending U.S. patent application Serial Numbers:

U.S. Ser. No. 09/643,798 by Chen et al., filed of even date herewith, entitled "Ink Jet Ink Composition";

U.S. Ser. No. 09/643,281 by Shuttleworth et al., filed of even date herewith, entitled "Ink Jet Ink Composition";

U.S. Ser. No. 09/643,532 by Chen et al., filed of even date herewith, entitled "Ink Jet Printing Method";

the disclosures of which are hereby incorporated by reference.

FIELD OF THE INVENTION

This invention relates to an ink jet ink printing method using an ink jet ink composition containing a quaternized nitrogen heterocyclic azo dye.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form- the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength (λ-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes which meet all of these requirements.

Another group of dyes are basic or cationic dyes which were developed mainly for the dyeing of synthetic textile fibers such as acrylics and acid-modified polyesters. These dyes are positively charged, due to either the incorporation of pendant, positively-charged substituent groups, such as tetraalkylammonium, or by virtue of the basic chromophore comprising a delocalized cationic system such as a cyanine, azacyanine or azo (diazacyanine).

U.S. Pat. No. 5,560,996 discloses a variety of cationic dyes, including cationic azo dyes such as Basic Red 46 and other cationic magenta dyes such as Basic Reds 12, 14 and 15 for use in an ink jet ink. As will be shown below, these dyes have poor light stability.

It is an object of this invention to provide an ink jet printing method using cationic dyes suitable for use in aqueous inks for ink jet printing that will provide bright, light stable images.

SUMMARY OF THE INVENTION

This and other objects are achieved in accordance with this invention which relates to an ink jet printing method, comprising the steps of:

A) providing an ink jet printer that is responsive to digital data signals;

B) loading the printer with ink-receptive elements comprising a support having thereon a porous ink-receptive layer;

C) loading the printer with an ink jet ink composition comprising water, a humectant, and a delocalized cationic azo dye derived from the quatemization of a nitrogen heterocyclic azo dye having the following formula:

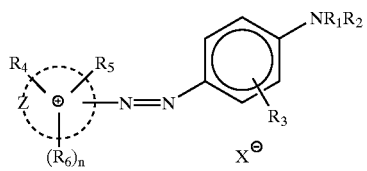

wherein:

Z represents the atoms necessary to complete a nitrogen-containing heterocyclic ring containing 2 or 3 nitrogen atoms and the balance carbon atoms;

$R_1$ and $R_2$ each independently represents hydrogen or a substituted or unsubstituted alkyl group of 1 to about 6 carbon atoms;

$R_4$, $R_5$ and $R_6$ each independently represents the same substituents as $R_1$ and $R_2$, halogen, cyano, substituted or unsubstituted alkoxy, acyl, benzoyl or alkoxycarbonyl; with the proviso that at least one of $R_4$, $R_5$ and $R_6$ represents a substituted or unsubstituted alkyl group of 1 to about 6 carbon atoms attached to a nitrogen atom;

$R_3$ represents the same groups as $R_4$, $R_5$ and $R_6$; hydroxy; a polyoxyalkylene group of 2-20 alkylene oxide residues; carboxy or sulfo or phospho ester; carbamoyl; substituted or unsubstituted alkyl-, arylaralkyl-, diaryl- or dialkyl-carbamoyl of 1 to about 20 carbon atoms; sulfamoyl; substituted or unsubstituted alkyl-, aryl-, aralkyl-, diaryl- or dialkyl-sulfamoyl of 1 to about 20 carbon atoms; acylamino; sulfonylamino; amino; a substituted or unsubstituted alkyl-, aryl-, aralkyl-, diaryl- or dialkylamino-of 1 to about 20 carbon atoms; or a quaternary ammonium or phosphonium group; or may be combined with $R_2$ to form a carbocyclic or heterocyclic 5 or 6 membered ring;

n is 1 except when Z represents the atoms necessary to complete a nitrogen-containing heterocyclic ring containing 3 nitrogen atoms, in which case n is 0; and X represents a counterion, such as citrate, gluconate or lactate;

with the proviso that when Z represents the atoms necessary to complete a nitrogen-containing heterocyclic ring of 3 nitrogen atoms, then $R_3$ is combined with $R_2$ to form a carbocyclic or heterocyclic 5 or 6 membered ring; and D) printing on an ink-receptive substrate using the ink jet ink in response to the digital data signals.

It has been found that use of the above dyes provides excellent hue characteristics and light stability.

DETAILED DESCRIPTION OF THE INVENTION

Quaternized nitrogen heterocyclic-azo dyes are not new. They have been used for dyeing fabrics, particularly polyacrylonitrile fabrics. Typical examples are quaternized pyrazole-azo, imidazole-azo, triazole-azo dyes. Their use been described for this purpose in "Chemistry and Application of Dyes" ed. Waring and G. Hallas, (Plenum Press), p184. A typical preparation of of this type is also described in the above reference (p197).

Examples of dyes which can be used in the invention are as follows:

| Dye | $R_1$ | $R_2$–$R_3$ | $R_4$ | $R_5$ | λ-max (nm) |
|---|---|---|---|---|---|
| 1 | n-$C_4H_9$ | 2,2,4,7-Tetramethyl tetrahydroquinoline | $CH_3$ | $CH_3$ | 547 |
| 2 | —H | 2,2,4,7-Tetramethyl tetrahydroquinoline | $CH_3$ | $CH_3$ | 534 |
| 3 | n-$C_4H_9$ | 2,2,4,7-Tetramethyl tetrahydroquinoline | $C_2H_5$ | $C_2H_5$ | 549 |
| 4 | $C_2H_5$ | 2-Methyl-benzoxazine | $CH_3$ | $CH_3$ | 546 |
| 5 | $C_2H_4OH$ | 2,2,4-Trimethyl tetrahydroquinoline | $CH_3$ | $CH_3$ | 544 |

| Dye | $R_1$ | $R_2$ | $R_3$ | $R_4$ | $R_5$ | $R_6$ | λ max |
|---|---|---|---|---|---|---|---|
| 6 | n-$C_4H_9$ | | 2,2,4,7-Tetramethyl tetrahydroquinoline | $CH_3$ | $CH_3$ | $CONH(C_2H_4OH)_2$ | 551 |
| 7 | $C_2H_4Cl$ | | 2,2,4,7-Tetramethyl tetrahydroquinoline | $CH_3$ | $CH_3$ | $CO_2CH_3$ | 530 |
| 8 | $C_2H_5$ | | 2,2,4-Trimethyl tetrahydroquinoline | $CH_3$ | $CH_3$ | $CONHC_4H_9$ | 550 |
| 9 | $C_2H_5$ | $C_2H_5$ | H | $CH_3$ | $CH_3$ | CN | 550 |
| 10 | n-$C_4H_9$ | | 2,2,4,7-Tetramethyl tetrahydroquinoline | $CH_3$ | $CH_3$ | $CO_2CH_3$ | 546 |
| 11 | n-$C_3H_7$ | n-$C_3H_7$ | 3-$NHCOCH_3$ | $CH_3$ | $CH_3$ | $CO_2CH_3$ | 544 |
| 12 | $C_2H_5$ | $C_2H_5$ | 3-$CH_3$ | $CH_3$ | $CH_3$ | CN | 554 |

In a preferred embodiment of the invention, $R_1$ in the above formula represents hydrogen. In another preferred embodiment, $R_2$ represents $C_4H_9$. In still another preferred embodiment, $R_2$ and $R_3$ are taken together and represent a tetrahydroquinoline ring. In yet another preferred embodiment, $R_4$ represents CN or $CON(C_2H_4OH)_2$. In still another preferred embodiment, $R_5$ and $R_6$ each represents $CH_3$.

In general, the above dyes comprise from about 0.2 to about 5%, preferably from about 0.5 to 3%, by weight of the ink jet composition.

The water solubility of cationic dyes is significantly affected by the nature of the counterion X. The counterion preferred for solubility is often not readily incorporated during the synthesis. Ion exchange via ion exchange resins or dialysis/ultrafiltration or deprotonation and reprotonation with the desired acid counterion, is often necessary to produce dyes having the preferred salt for high water solubility.

In addition to the colorant, other ingredients are also commonly added to ink jet inks. Water miscible organic solvents humectants and/or co-solvents may be added to aqueous inks to help prevent the ink from drying out or crusting in the orifices of the printhead or to help the ink penetrate the receiving substrate, especially when the substrate is a highly sized paper. Examples of such solvents include glycols and derivatives thereof, including propylene glycol, polypropylene glycol, ethylene glycol, polyethylene glycol, diethylene glycol, glycerol, thiodiethanol, tetraethylene glycol (and mixtures and derivatives thereof), low molecular weight alcohols such as ethanol and isopropanol and amides such as N-methylpyrrolidone.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of micro-organisms such as molds, fungi, etc. in aqueous inks. A preferred biocide for the ink composition of the present invention is Proxelg® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLE

Synthesis of Dye 1 a) 3-Amino-1,2,4-triazole (7.56 g)(0.09 m) was dissolved in a mixture of sulfuric acid (9.9 ml) and water (36 ml) at 25° C. Acetic acid (36 m1) was added and the mixture cooled to 0–5° C. Then, 5M sodium nitrite solution (from 7 g NaNO$_2$ in 20 ml H$_2$O) was added slowly keeping the temperature<5° C. The mixture was stirred at this temperature for 3 hours, and then excess nitrite was decomposed by addition of a 10% solution of sulfamic acid.

The diazo solution was added to a solution of the coupler, N-butyl-2,2,4,7-tetramethyl tetrahydroquinoline, (22 g) (0.09 m) in acetic acid (75 ml). The mixture was neutralized with sodium acetate and ice, gradually, and finally diluted with ice-water. An oil was formed which solidified overnight at 21° C. The dye was filtered, washed with water and dried. The yield was 23.3 g (76%).

b) The above dye (16.8 g)(0.05 m) was dissolved in acetic acid (300 ml) and magnesium oxide (5.25 g) added. The mixture was heated to 70° C. and dimethyl sulfate (30 ml) was added. Heating was continued at 80–900° C. for 3 hours, and the mixture was then drowned into water (ca 1.51). The solution was filtered through celite, and sodium perchlorate (30 g), in a little water was added to the filtrate slowly with stirring. The dye was filtered washed with water and dried. The yield was 18 g (77.8%)

c) The dye was converted to its lactate form by stirring 1 g of perchlorate dye in 20 ml water with 4 g of lactate ion exchange resin (previously prepared from Ambeijet®4200(Cl) resin, and flooding with sodium lactate solution). The mixture was stirred at 60–70° C. for 2–3 hours, cooled to 21° C. and filtered. The filtrate was used directly as a dye concentrate to prepare the ink jet ink Synthesis of Dye 12 a) 3-Amino-4-cyano-pyrazole (5.4 g) (0.05 m) was dissolved in 50% sulfuric acid (125 ml), and cooled to 0–50°

C. Sodium nitrite (3.6 g) (0.052 m) was added slowly at<5° C., and then allowed to diazotize for 2.5 hours. The diazo solution was added to the coupler, N,N-diethyl m-toluidine, in acetic acid (125 ml). 1500 g of ice/water was added followed by sodium acetate (175 g). The mixture was stirred overnight, filtered, washed with water and dried. The yield was 9.1 g (65%)

b) The above dye (5 g) was heated in dimethyl sulfate (40 ml) at 100° C. for 3–4 hours. The mixture was then drowned into water (ca 1l) and stirred for 2 hours to decompose excess dimethyl sulfate. The dye was then precipitated as its fluorborate salt by addition of sodium fluoroborate (6 g) dissolved in a little water. The dye was filtered, after stirring overnight, was washed with water and dried. The yield was 3.1 g c) The dye was converted to its lactate form by stirring 1 gram of the fluroborate dye in 20 ml water with 4 g of lactate ion exchange resin (previously prepared from Ambedjet®4200(Cl) resin, and flooding with sodium lactate solution). The mixture was stirred at 60–70° C. for 2–3 hours, cooled to 21° C. and filtered. The filtrate was used directly as a dye concentrate to prepare the ink jet ink.

Preparation of Inks

Inks containing the above dyes were prepared by mixing an appropriate amount of the dye concentrate prepared as above with de-ionized water containing humectants of diethylene glycol and glycerol, each at 6%, a biocide, Proxel GXL® at 0.003 wt. % and a surfactant, Surfynol 465®(Air Products Co.) at 0.5 wt. %.

The dye concentrations were based on solution absorption spectra and chosen such that the final ink when diluted 1:1000, would yield a transmission optical density of approximately 1.0.

Printing of Test Images

The above prepared inks were filtered through a 0.45 μm polytetrafluoroethylene filter and placed in a Hewlett-Packard ink cartridge No HP 51629A and fitted into the black ink station of a Hewlett-Packard Deskjet®660C printer. A test image consisting of a series of 21 variable density patches approximately 15 by 13 mm in size, ranging from 5% dot coverage to 100% dot coverage was printed on to Kodak Inkjet Photographic Quality Paper, Catalog No. 899-9161, and allowed to dry for 24 hours at ambient temperature and humidity.

The following control dyes were evaluated by the above method as comparative examples:

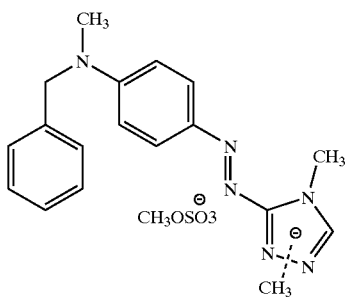

C1

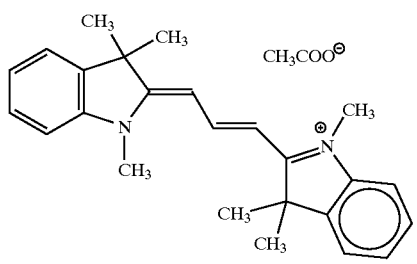

Basic Red 12

Verona® Basic Red P Liquid (12-04-300)

C3

Basic Red 15

Sevron® Brilliant Red E

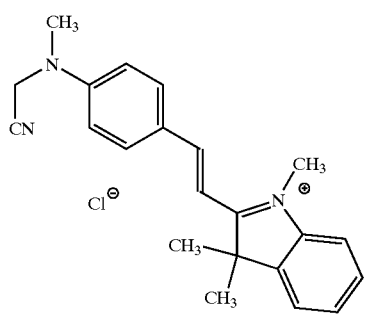

Basic Red 14

Astrazon® Brilliant Red 4G 200

Evaluation of Test Images

For each ink, the Status A green reflection densities of the above patches corresponding to 75% and 100% dot coverage were measured using an X-Rite® 820 densitometer. The green density at 100% dot coverage (D-max) is listed in the Table below. The stepped images were then subjected to light fade under 50 K-lux high intensity daylight irradiation and 50% relative humidity for 2 weeks. The Status A green densities of the stepped images were re-measured and the retained dye % in Status A green density for the 75% dot coverage patches were calculated for each ink and are also listed in the following table:

| Ink from Dye No | D-max | Light Fade % Retained |
| --- | --- | --- |
| 1 | 1.9 | 87 |
| 6 | 1.9 | 98 |
| 8 | 2.2 | 95 |
| 9 | 2.1 | 95 |
| 10 | 1.3 | 98 |
| 11 | 2.2 | 93 |
| 12 | 1.8 | 96 |
| C1 | 2.3 | 72 |
| C2 | 1.6 | 12 |

-continued

| Ink from Dye No | D-max | Light Fade % Retained |
|---|---|---|
| C3 | 2.1 | 22 |
| C4 | 1.8 | 41 |

The above results show that the dyes employed in the invention gave high density images with better light stability than the cationic dyes of the prior art.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive elements comprising a support having thereon a porous ink-receptive layer;
   C) loading said printer with an ink jet ink composition comprising water, a humectant, and a delocalized cationic azo dye derived from the quaternization of a nitrogen heterocyclic azo dye having the following formula:

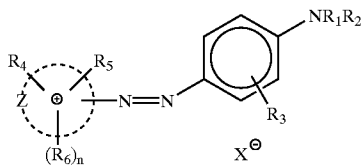

wherein:

Z represents the atoms necessary to complete a nitrogen-containing heterocyclic ring containing 2 or 3 nitrogen atoms and the balance carbon atoms;

$R_1$ and $R_2$ each independently represents hydrogen or a substituted or unsubstituted alkyl group of 1 to about 6 carbon atoms;

$R_4$, $R_5$ and $R_6$ each independently represents the same substituents as $R_1$ and $R_2$, halogen, cyano, substituted or unsubstituted alkoxy, acyl, benzoyl or alkoxycarbonyl; with the proviso that at least one of $R_4$, $R_5$ and $R_6$ represents a substituted or unsubstituted alkyl group of 1 to about 6 carbon atoms attached to a nitrogen atom;

$R_3$ represents the same groups as $R_4$, $R_5$ and $R_6$; hydroxy; a polyoxyalkylene group of 2–20 alkylene oxide residues; carboxy or sulfo or phospho ester; carbamoyl; substituted or unsubstituted alkyl-, aryl- aralkyl-, diaryl- or dialkyl-carbamoyl of 1 to about 20 carbon atoms; sulfamoyl; substituted or unsubstituted alkyl-, aryl-, aralkyl-, diaryl- or dialkyl-sulfamoyl of 1 to about 20 carbon atoms; acylamino; sulfonylamino; amino; a substituted or unsubstituted alkyl-, aryl-, aralkyl-, diaryl- or dialkylamino of 1 to about 20 carbon atoms; or a quaternary ammonium or phosphonium group; or may be combined with $R_2$ to form a carbocyclic or heterocyclic 5 or 6 membered ring;

n is 1 except when Z represents the atoms necessary to complete a nitrogen-containing heterocyclic ring containing 3 nitrogen atoms, in which case n is 0; and X represents a counterion;

with the proviso that when Z represents the atoms necessary to complete a nitrogen-containing heterocyclic ring of 3 nitrogen atoms, then $R_3$ is combined with $R_2$ to form a carbocyclic or heterocyclic 5 or 6 membered ring; and D) printing on an ink-receptive substrate using said ink jet ink in response to said digital data signals.

2. The method of claim 1 wherein $R_1$ in the above formula represents hydrogen.

3. The method of claim 1 wherein $R_2$ represents $C_4H_9$.

4. The method of claim 1 wherein $R_2$ and $R_3$ are taken together and represent a tetrahydroquinoline ring.

5. The method of claim 1 wherein $R_4$ represents CN.

6. The method of claim 1 wherein X represents citrate, gluconate or lactate.

7. The method of claim 1 wherein $R_5$ and $R_6$ each represents $CH_3$.

8. The method of claim 1 wherein $R_4$ represents $CON(C_2H_4OH)_2$.

9. The method of claim 1 wherein said humectant is diethylene glycol, glycerol or diethylene glycol monobutylether.

10. The method of claim 1 wherein said dye comprises about 0.2 to about 5% by weight of said ink jet ink composition.

* * * * *